US011564228B2

(12) United States Patent
Tang

(10) Patent No.: US 11,564,228 B2
(45) Date of Patent: Jan. 24, 2023

(54) METHOD FOR TRANSMITTING REFERENCE SIGNAL, NETWORK DEVICE, AND TERMINAL DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 288 days.

(21) Appl. No.: 16/304,647

(22) PCT Filed: May 26, 2016

(86) PCT No.: PCT/CN2016/083552
§ 371 (c)(1),
(2) Date: Nov. 26, 2018

(87) PCT Pub. No.: WO2017/201719
PCT Pub. Date: Nov. 30, 2017

(65) Prior Publication Data
US 2021/0051662 A1 Feb. 18, 2021

(51) Int. Cl.
*H04W 72/04* (2009.01)
*H04W 76/11* (2018.01)
(Continued)

(52) U.S. Cl.
CPC ....... *H04W 72/0493* (2013.01); *H04L 5/0051* (2013.01); *H04W 68/005* (2013.01);
(Continued)

(58) Field of Classification Search
CPC .......... H04W 72/0493; H04W 68/005; H04W 72/042; H04W 80/02; H04W 72/046;
(Continued)

(56) References Cited

U.S. PATENT DOCUMENTS 9,148,818 B2 * 9/2015 Yue ..................... H04B 7/0486
9,515,796 B2   12/2016 Chun
(Continued)

FOREIGN PATENT DOCUMENTS

CN    102340344 A    2/2012
CN    104081852 A    10/2014
(Continued)

OTHER PUBLICATIONS

3GPP TS 36.211, v13.1.0 (Apr. 2016) (Year: 2016).*
(Continued)

*Primary Examiner* — Yu-Wen Chang
(74) *Attorney, Agent, or Firm* — Ladas & Parry LLP

(57) ABSTRACT

Disclosed are a method for transmitting a reference signal, a network device, and a terminal device. The method comprises: the network device determines target resources for transmitting the reference signal, the target resource being some of transmission resources which can be used for transmitting the reference signal, and the target resources comprising at least one of frequency domain resources, time domain resources, and space domain resources; the network device transmits the reference signal to the terminal device on the target resources. According to the method for transmitting the reference signal, the network device, and the terminal device of embodiments of the present invention, energy saving of the network device can be realized, and meanwhile, interference between cells is avoided.

17 Claims, 5 Drawing Sheets

(51) Int. Cl.
*H04L 5/00* (2006.01)
*H04W 68/00* (2009.01)
*H04W 80/02* (2009.01)

(52) U.S. Cl.
CPC ....... *H04W 72/042* (2013.01); *H04W 72/046* (2013.01); *H04W 72/0446* (2013.01); *H04W 72/0453* (2013.01); *H04W 76/11* (2018.02); *H04W 80/02* (2013.01)

(58) Field of Classification Search
CPC ............. H04W 72/0446; H04W 76/11; H04W 72/0453; H04L 5/0051
See application file for complete search history.

(56) References Cited

U.S. PATENT DOCUMENTS

| | | | |
|---|---|---|---|
| 2013/0178220 A1* | 7/2013 | Lee | H04L 5/0007 455/450 |
| 2013/0195043 A1 | 8/2013 | Chen et al. | |
| 2013/0315191 A1* | 11/2013 | Yoshimoto | H04J 11/0056 370/329 |
| 2013/0331138 A1 | 12/2013 | Kim | |
| 2014/0133429 A1 | 5/2014 | Chun | |
| 2015/0023331 A1* | 1/2015 | You | H04L 5/0048 370/336 |
| 2015/0049693 A1* | 2/2015 | Seo | H04L 5/0096 370/329 |
| 2015/0124758 A1* | 5/2015 | Kim | H04L 1/0693 370/329 |
| 2015/0223254 A1* | 8/2015 | Guo | H04W 72/0493 370/312 |
| 2015/0229453 A1 | 8/2015 | Dai et al. | |
| 2015/0230220 A1* | 8/2015 | Li | H04L 5/0053 370/329 |
| 2015/0350942 A1* | 12/2015 | Wei | H04W 72/08 370/330 |
| 2016/0021632 A1* | 1/2016 | Sun | H04W 56/00 370/350 |
| 2016/0205692 A1* | 7/2016 | Zhang | H04W 72/0453 370/329 |
| 2017/0149480 A1* | 5/2017 | Kakishima | H04B 7/0456 |
| 2017/0264390 A1* | 9/2017 | Liu | H04L 1/0001 |
| 2017/0265082 A1* | 9/2017 | Jiang | H04W 72/042 |
| 2017/0290046 A1* | 10/2017 | Sun | H04L 5/0053 |
| 2017/0332268 A1* | 11/2017 | Yang | H04W 72/042 |
| 2018/0063828 A1* | 3/2018 | Wang | H04L 5/0023 |
| 2018/0205522 A1* | 7/2018 | Wang | H04L 5/0053 |
| 2019/0036570 A1* | 1/2019 | Deng | H04B 7/0413 |
| 2019/0116594 A1* | 4/2019 | Kwak | H04W 72/0453 |

FOREIGN PATENT DOCUMENTS

| | | |
|---|---|---|
| CN | 104272616 A | 1/2015 |
| CN | 104488201 A | 4/2015 |
| EP | 2906016 A1 | 8/2015 |
| JP | 2015510723 A | 4/2015 |
| JP | 2015513237 A | 4/2015 |
| JP | 2015514349 A | 5/2015 |
| WO | 2013112960 A1 | 8/2013 |
| WO | 2015045658 A1 | 4/2015 |
| WO | 2015161516 A | 10/2015 |
| WO | 2016013351 A1 | 1/2016 |

OTHER PUBLICATIONS

English translation of the Written Opinion of the International Search Authority in thr international application No. PCT/CN2016/083552, dated Mar. 2, 2017.

Interdigital Communications :"Framework for forward compatible NR design", 3GPP Draft; RI-164664, 3rd Generation Partnership Project (3GPP), Mobile Compeience Centre; 650, Route Des Lucioles; F-06921 Sophia-Antipolis Cedex; France,vol. RAN WG1, No. Nanjing, China; May 23, 2016-May 27, 2016 May 14, 2016 (May 14, 2016), XP051096363, Retrieved from the Internet:URL:http://www.3gpp.org/ftp/tsg_ran/WG1_RL1/TSGR1_85/Docs/ [retrieved on May 14, 2016] * Section 3.; p. 2 *.

Interdigital Communications:"Reference signal principles for NR", 3GPP Draft; RI-162578, 3rd Generation Partnership Project (3GPP), Mobile Competence Centre; 650, Route Des Lucioles F-06921 Sophia-Antipolis Cedex; France,vol. RAN WG1,No. Busan, Korea; Apr. 11, 2016-Apr. 15, 2016 Apr. 2, 2016 (Apr. 2, 2016), XP051080267, Retrieved from thr Internet:URL:http://www.3gpp.org/ftp/tsg_ran/WG1_RL1/TSGR1_84b/ Docs/ [retrieved on Apr. 2, 2016] * the whole document *.

Supplementary European Search Report in the European application No. 16902709.1, dated Apr. 5, 2019.

First Office Action of the Japanese application No. 2018-562013, dated May 22, 2020.

Office Action of the Indian application No. 201817049015, dated Jul. 21, 2020.

First Office Action of the Canadian application No. 3043782, dated Jun. 15, 2020.

First Office Action of the Chinese application No. 201680086142.1, dated Aug. 9, 2019.

Second Office Action of ths Chinese application No. 201880086142.1, dated Nov. 8, 2019.

3GPP TS 36.331 V13.0.0 (Dec. 2015), 3rd Generation Partnership Project Techn Seal Specification Group Radio Access Network;Evolved Universal Terrestrial Radio Access (E-UTRA); Radio Resource Control (RRC); Protocol specification (Release 13).

3GPP TS 36.211 V13.0.0 (Dec. 2015), 3rd Generation Partnership ProjectTechnical Specification Group Radio Access Network;Evolved Universal Terrestrial Radio Access (E-UTRA); Physical channels and modulation(Release 13).

First Office Action of the Singaporean application No. 11201902259V, dated Feb. 20, 2020.

Decision of Refusal of the Chinese applicafion No. 201680086142.1, dated Feb. 11, 2020.

International Search Report in international application No. PCT/CN2016/083552, dated Mar. 2, 2017.

Written Opinion of the International Search Authority in international application No. PCT/CN2016/083552, dated Mar. 2, 2017.

First Office Action of the European application No. 16902709.1, dated Nov. 27, 2020.

Second Office Action of the Japanese application No. 2018-562013, dated Dec. 18, 2020.

Second Written Opinion of the Singaporean application No. 11201902259V, dated Jan. 22, 2021.

First Office Action of tee Taiwanese application No. 106116209, dated Jan. 22, 2021.

Second Office Action of the Canadian application No. 3043782, dated Mar. 19, 2021.

Notice of Review of the Taiwanese application No. 106116209, dated Jul. 27, 2021.

Second Office Action of the European application No. 16902709.1, dated Feb. 18, 2022.

First Office Action of the Chinese application No. 202011444528.0, dated Jun. 14, 2022.

Second Office Action of the Chinese application No. 202011444526.0, dated Sep. 16, 2022.

* cited by examiner

METHOD FOR TRANSMITTING REFERENCE SIGNAL, NETWORK DEVICE, AND TERMINAL DEVICE

TECHNICAL FIELD

The disclosure relates to communications, and more particularly to a method for transmitting a reference signal, a network device and a terminal device.

BACKGROUND

A reference signal, for example, a Cell-specific Reference Signal (CRS), is effective to all terminal devices in a cell and has the following functions. (1) It may be adopted by a terminal device for channel estimation over any other downlink physical channel except a Physical Multicast Channel (PMCH) and a Physical Downlink Shared Channel (PDSCH) in a transmission mode 7/8/9 (corresponding to non-codebook-based precoding). (2) It may be adopted by the terminal device to acquire Channel State Information (CSI). (3) CRS-based terminal measurement may be implemented as a basis of determining cell selection and handover.

However, at present, a reference signal in a Long Term Evolution (LTE) system is sent on a full bandwidth and is sent on each downlink subframe, which may result in resource waste, increase of energy consumption of a network device and interference between cells.

SUMMARY

Embodiments of the disclosure provide a method for transmitting a reference signal, a network device and a terminal device, which may achieve energy saving of the network device and avoid interference between cells.

A first aspect provides a method for transmitting a reference signal. A network device determines a target resource configured to transmit a reference signal, the target resource being part of resources in transmission resources available for transmission of the reference signal and the target resource including at least one of a frequency-domain resource, a time-domain resource or a space-domain resource. The network device transmits the reference signal to a terminal device on the target resource.

Thus it can be seen that, according to the method provided in the embodiments of the disclosure, the reference signal may be transmitted on part of specific resource locations. Therefore, energy consumption of the network device may be reduced, and interference between cells is avoided.

The time-domain resource may include at least one time bucket and/or at least one time point and, optionally, the at least one time bucket and/or the at least one time point are/is periodically distributed.

As another embodiment, the operation that the network device determines the target resource configured to transmit the reference signal may include that: the network device determines a reference identifier, the reference identifier including a cell identifier or a beam identifier; and the network device determines the target resource configured to transmit the reference signal according to the reference identifier and a correspondence between a reference identifier and a resource identifier, the resource identifier corresponding to the target resource one to one.

As another embodiment, the correspondence between reference identifier and the resource identifier may include i=mod(Cell ID,I) or i=mod(Beam ID,I), where i may represent the resource identifier, Cell ID may represent the cell identifier, Beam ID may represent the beam identifier and I may represent a maximum resource identifier number.

As another embodiment, the method may further include that: the network device transmits indication information to the terminal device, the indication information including resource indication information configured to indicate the target resource.

As another embodiment, the method may further include that: the network device transmits indication information to the terminal device, the indication information including identifier indication information configured to indicate the resource identifier and the resource identifier corresponding to the target resource one to one.

A mapping relationship between a target resource and a resource identifier may be configured through a network side and may also be predefined in a protocol.

As another embodiment, the resource identifier may include at least one of the following identifiers: a frequency-domain resource identifier configured to indicate the frequency-domain resource, a time-domain resource identifier configured to indicate the time-domain resource and a time-domain resource period, a space-domain resource identifier configured to indicate the space-domain resource or a combined resource identifier configured to indicate at least two resources in the frequency-domain resource, the time-domain resource and the space-domain resource.

As another embodiment, when the resource identifier includes the time-domain resource identifier, the operation that the network device determines the target resource configured to transmit the reference signal may include that: the network device determines the frequency-domain resource configured to transmit the reference signal according to any one of the following correspondences: $i_f$=mod(RN,$I_f$), $i_f$=mod($P_i$,$I_f$), $i_f$=mod($Dt_i$,$I_f$) or $i_f$=mod($i_t$,$I_f$); and/or the network device determines the space-domain resource configured to transmit the reference signal according to any one of the following correspondences: $i_l$=mod(RN,$I_l$), $i_l$=mod($P_i$,$I_l$), $i_l$=mod($Dt_i$,$I_l$) or $i_l$=mod($i_t$,$I_l$), RN may represent a resource serial number of the time-domain resource in the time-domain resource period, $P_i$ may represent a serial number of the time-domain resource period, $Dt_i$ may represent a time bucket or time point corresponding to the time-domain resource in the time-domain resource period, $i_t$ may represent the time-domain resource identifier, $i_f$ may represent the frequency-domain resource identifier, $i_l$ may represent the space-domain resource identifier, $I_f$ may represent a maximum frequency-domain resource identifier number and $I_l$ may represent a maximum space-domain resource identifier number.

Information of the time-domain resource period may be carried in information of the time-domain resource identifier and may also be independently configured or specified in the protocol.

In addition, the resource serial number RN of the time-domain resource in the time-domain resource period may include a serial number of a radio frame such as a System Frame Number (SFN), a subframe number, a time slot number or the like.

As another embodiment, when the resource identifier includes the frequency-domain resource identifier, the operation that the network device determines the target resource configured to transmit the reference signal may include that: the network device determines the time-domain resource configured to transmit the reference signal according to $i_t$=mod($i_f$,$I_t$); and/or the network device determines the space-domain resource configured to transmit the reference signal according to $i_f=\text{mod}(i_f,I_f)$. $i_t$ may represent the time-domain resource identifier, $I_t$ may represent a maximum time-domain resource identifier number, $i_f$ may represent the frequency-domain resource identifier, $I_l$ may represent the maximum space-domain resource identifier number and $i_l$ may represent the space-domain resource identifier.

As another embodiment, when the resource identifier includes the space-domain resource identifier, the operation that the network device determines the target resource configured to transmit the reference signal may include that: the network device determines the time-domain resource configured to transmit the reference signal according to $i_t=\text{mod}(i_t,I_t)$; and/or the network device determines the frequency-domain resource configured to transmit the reference signal according to $i_f=\text{mod}(i_f,I_f)$. $i_t$ may represent the time-domain resource identifier, $I_t$ may represent the maximum time-domain resource identifier number, $i_f$ may represent the frequency-domain resource identifier, $I_f$ may represent the maximum frequency-domain resource identifier number and $i_l$ may represent the space-domain resource identifier.

As another embodiment, the operation that the network device transmits the indication information to the terminal device may include that: the network device transmits the indication information carried in high-layer signaling, physical-layer signaling or a Media Access Control (MAC)-layer notification to the terminal device.

Optionally, each of three resource items corresponding to the frequency-domain resource, the time-domain resource and the space-domain resource optionally exists. If a certain resource item is not configured for the reference signal, that is, the resource item is vacant, the reference signal may be freely sent on the resource represented on the resource item. For example, the reference signal is sent on the whole resource corresponding to the resource item and available for transmission of the reference signal. Alternatively, the reference signal may be sent at a specific resource location predetermined in the protocol.

As another embodiment, the method may further include that: if the target resource is changed, the network device transmits a paging message to the terminal device, the paging message including information of the changed target resource or an indication message configured to indicate that the target resource is changed.

A second aspect provides a network device, which may be configured to execute each process executed by the network device in the method for transmitting the reference signal in the first aspect and each of implementation modes. The network device includes a determination module and a transmission module. The determination module is configured to determine a target resource configured to transmit a reference signal, the target resource being part of resources in transmission resources available for transmission of the reference signal and the target resource including at least one of a frequency-domain resource, a time-domain resource or a space-domain resource. The transmission module is configured to transmit the reference signal to a terminal device on the target resource determined by the determination module.

A third aspect provides a network device, which may be configured to execute each process executed by the network device in the method for transmitting the reference signal in the first aspect and each of implementation modes. The network device includes: a processor and a transmitter. The processor is configured to determine a target resource configured to transmit a reference signal, the target resource being part of resources in transmission resources available for transmission of the reference signal and the target resource including at least one of a frequency-domain resource, a time-domain resource or a space-domain resource. The transmitter is configured to transmit the reference signal to a terminal device on the target resource.

A fourth aspect provides a method for transmitting a reference signal. A terminal device determines a target resource configured to transmit a reference signal, the target resource being part of resources in transmission resources available for transmission of the reference signal and the target resource including at least one of a frequency-domain resource, a time-domain resource or a space-domain resource. The terminal device receives the reference signal sent by a network device on the target resource.

The time-domain resource may include at least one time bucket and/or at least one time point and, optionally, the at least one time bucket and/or the at least one time point are/is periodically distributed.

As another embodiment, the operation that the terminal device determines the target resource configured to transmit the reference signal may include that: the terminal device determines a reference identifier, the reference identifier including a cell identifier or a beam identifier; and the terminal device determines the target resource configured to transmit the reference signal according to the reference identifier and a correspondence between a reference identifier and a resource identifier, the resource identifier corresponding to the target resource one to one.

As another embodiment, the correspondence between the reference identifier and the resource identifier may include $i=\text{mod}(\text{Cell ID},I)$ or $i=\text{mod}(\text{Beam ID},I)$, where i may represent the resource identifier, Cell ID may represent the cell identifier, Beam ID may represent the beam identifier and I may represent a maximum resource identifier number.

As another embodiment, the operation that the terminal device determines the target resource configured to transmit the reference signal may include that: the terminal device receives indication information sent by the network device, the indication information including resource indication information configured to indicate the target resource.

As another embodiment, the operation that the terminal device determines the target resource configured to transmit the reference signal may include that: the terminal device receives indication information sent by the network device, the indication information including identifier indication information configured to indicate a resource identifier; and the terminal device determines the target resource corresponding to the resource identifier one to one according to the identifier indication information.

As another embodiment, the resource identifier may include at least one of the following identifiers: a frequency-domain resource identifier configured to indicate the frequency-domain resource, a time-domain resource identifier configured to indicate the time-domain resource and a time-domain resource period, a space-domain resource identifier configured to indicate the space-domain resource or a combined resource identifier configured to indicate at least two resources in the frequency-domain resource, the time-domain resource and the space-domain resource.

As another embodiment, when the resource identifier includes the time-domain resource identifier, the operation that the terminal device determines the target resource configured to transmit the reference signal may include that: the terminal device determines the frequency-domain resource configured to transmit the reference signal according to any one of the following correspondences: $i_f=\text{mod}(RN,I_f)$, $i_f=\text{mod}(P_t,I_f)$, $i_f=\text{mod}(Dt_t,I_f)$, or $i_f=\text{mod}(i_t,I_f)$; and/or the terminal device determines the space-domain resource configured to transmit the reference signal according to any one of the following correspondences: $i_t$=mod(RN,$I_t$), $i_t$=mod($P_i$,$I_t$), $i_t$=mod($Dt_i$,$I_t$) or $i_t$=mod($i_t$,$I_t$). RN may represent a resource serial number of the time-domain resource in the time-domain resource period, $P_i$ may represent a serial number of the time-domain resource period, $Dt_i$ may represent a time bucket or time point corresponding to the time-domain resource in the time-domain resource period, $i_t$ may represent the time-domain resource identifier, $i_f$ may represent the frequency-domain resource identifier, $i_l$ may represent the space-domain resource identifier, $I_f$ may represent a maximum frequency-domain resource identifier number and $I_l$ may represent a maximum space-domain resource identifier number.

Information of the time-domain resource period may be carried in the time-domain resource identifier and may also be independently configured or specified in a protocol.

In addition, the resource serial number RN of the time-domain resource in the time-domain resource period may include a serial number of a radio frame such as an SFN, a subframe number and a time slot number.

As another embodiment, when the resource identifier includes the frequency-domain resource identifier, the operation that the terminal device determines the target resource configured to transmit the reference signal may include that: the terminal device determines the time-domain resource configured to transmit the reference signal according to $i_t$=mod($i_f$,$I_t$); and/or the terminal device determines the space-domain resource configured to transmit the reference signal according to $i_t$=mod($i_f$,$I_l$). $i_t$ may represent the time-domain resource identifier, $I_t$ may represent a maximum time-domain resource identifier number, $i_f$ may represent the frequency-domain resource identifier, $I_l$ may represent the maximum space-domain resource identifier number and $i_l$ may represent the space-domain resource identifier.

As another embodiment, when the resource identifier includes the space-domain resource identifier, the operation that the network device determines the target resource configured to transmit the reference signal may include that: the terminal device determines the time-domain resource identifier configured for transmission of the reference signal according to $i_t$=mod($i_l$,$I_t$); and/or the terminal device determines the frequency-domain resource identifier configured for transmission of the reference signal according to $i_f$=mod ($i_l$,$I_f$). $i_t$ may represent the time-domain resource identifier, $I_t$ may represent the maximum time-domain resource identifier number, $i_f$ may represent the frequency-domain resource identifier, $I_f$ may represent the maximum frequency-domain resource identifier number and $i_l$ may represent the space-domain resource identifier.

As another embodiment, the operation that the terminal device receives the indication information sent by the network device may include that: the terminal device receives the indication information carried in high-layer signaling, physical-layer signaling or a MAC-layer notification from the network device.

Optionally, each of three resource items corresponding to the frequency-domain resource, the time-domain resource and the space-domain resource optionally exists. If a certain resource item is not configured for the reference signal, that is, the resource item is vacant, the reference signal may be freely sent on the resource represented on the resource item. For example, the reference signal is sent on the whole resource corresponding to the resource item and available for transmission of the reference signal. Alternatively, the reference signal may be sent at a specific resource location predetermined in the protocol.

As another embodiment, the method may further include that: if the target resource is changed, the terminal device receives a paging message sent by the network device, the paging message including information of the changed target resource or an indication message configured to indicate that the target resource is changed.

A fifth aspect provides a terminal device, which may be configured to execute each process executed by the terminal device in the method for transmitting the reference signal in the fourth aspect and each of implementation modes. The terminal device includes a determination module and a receiving module. The determination module is configured to determine a target resource configured to transmit a reference signal, the target resource being part of resources in transmission resources available for transmission of the reference signal and the target resource including at least one of a frequency-domain resource, a time-domain resource or a space-domain resource. The receiving module is configured to receive the reference signal sent by a network device on the target resource.

A sixth aspect provides a terminal device, which may be configured to execute each process executed by the terminal device in the method for transmitting the reference signal in the fourth aspect and each of implementation modes. The terminal device includes a processor and a receiver. The processor is configured to determine a target resource configured to transmit a reference signal, the target resource being part of resources in transmission resources available for transmission of the reference signal and the target resource including at least one of a frequency-domain resource, a time-domain resource or a space-domain resource. The receiver is configured to receive the reference signal sent by a network device on the target resource.

A seventh aspect provides a computer chip, including an input interface, an output interface, at least one processor and a memory. The processor is configured to execute a code in the memory. When the code is executed, the processor may implement each process executed by a terminal device in the method for transmitting data in the first aspect and each of implementation modes.

An eighth aspect provides a computer chip, including an input interface, an output interface, at least one processor and a memory. The processor is configured to execute a code in the memory. When the code is executed, the processor may implement each process executed by a network device in a method for transmitting data in the fourth aspect and each of implementation modes.

A ninth aspect provides a computer-readable storage medium, which stores a program. The program enables a terminal device to execute any method for transmitting a reference signal in the first aspect and each implementation mode thereof.

A tenth aspect provides a computer-readable storage medium, which stores a program. The program enables a network device to execute any reference signal transmission method in the fourth aspect and each implementation mode thereof.

BRIEF DESCRIPTION OF DRAWINGS

In order to describe the technical solutions of the embodiments of the disclosure more clearly, the drawings required to be used in the embodiments of the disclosure will be simply introduced below. It is apparent that the drawings described below are only some embodiments of the disclosure. Other drawings may further be obtained by those of ordinary skill in the art according to these drawings without creative work.

DETAILED DESCRIPTION

Figure 1:
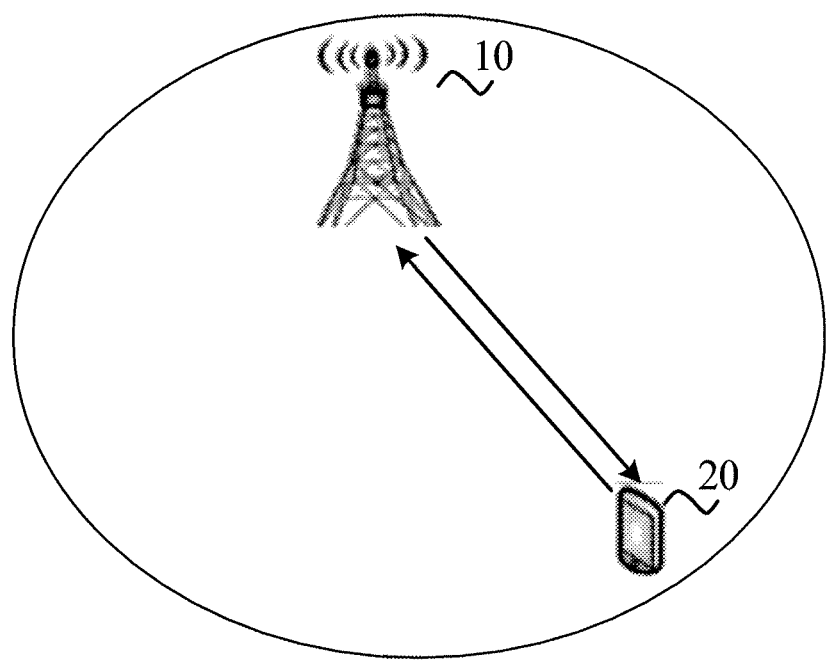
FIG. 1 is a schematic diagram of an application scenario according to an embodiment of the disclosure.

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skill in the art on the basis of the embodiments in the disclosure without creative work shall fall within the scope of protection of the disclosure.

It should be understood that the technical solutions of the embodiments of the disclosure may be applied to various communication systems, for example, a present communication system of a Global System of Mobile Communication (GSM), a Code Division Multiple Access (CDMA) system, a Wideband Code Division Multiple Access (WCDMA) system, a General Packet Radio Service (GPRS), an LTE system, a Universal Mobile Telecommunication System (UMTS) and the like, and are particularly applied to a future 5th-Generation (5G) system.

In the embodiments of the disclosure, a terminal device may also refer to User Equipment (UE), an access terminal, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in a future 5G network, a terminal device in a future evolved Public Land Mobile Network (PLMN) or the like.

In the embodiments of the disclosure, a network device may be a device configured to communicate with the terminal device. The network device may be a Base Transceiver Station (BTS) in the GSM or the CDMA, may also be a NodeB (NB) in the WCDMA system, may also be an Evolutional Node B (eNB or eNodeB) in the LTE system and may further be a wireless controller in a Cloud Radio Access Network (CRAN) scenario. Or the network device may be a relay station, an access point, a vehicle-mounted device, a wearable device, a network device in the future 5G network, a network device in the future evolved PLMN or the like. Descriptions will be made below with a base station as an example.

For a reference signal, for example, a CRS, in an existing LTE system, a cell may use 1, 2 or 4 CRSs and correspondingly use 1, 2 or 4 antenna ports respectively. The CRS is transmitted only in one or more of antenna ports 0~3. The CRS is sent on each downlink subframe and each Resource Block (RB) in the whole downlink bandwidth. On a Multicast Broadcast Single Frequency Network (MBSFN) subframe, the CRS may only be transmitted on a non-MBSFN region of the subframe. A CRS is sent on a full bandwidth and is sent on each downlink subframe, Therefore, considering from the angles of energy saving of a network device and avoidance of interference between cells, in a future 5G system, a reference signal may be selected to be sent on a specific frequency-domain resource and the reference signal may be regularly or irregularly sent on a specific time point or time bucket.

It should be understood that a reference signal in the embodiments of the disclosure may also be called a reference channel and the like, which is not limited in the disclosure. After the reference signal is sent at a specific resource location, a terminal device acquires the resource location of the reference signal in a certain manner, receives the reference signal and demodulates the reference signal, thereby using the reference signal for channel estimation or signal detection.

FIG. 1 is a schematic diagram of an application scenario according to the disclosure. A communication system in FIG. 1 may include a base station 10 and a terminal device 20. The base station 10 is configured to provide communication service for the terminal device 20 for access to a core network. The terminal device 20 searches a synchronization signal, broadcast signal and the like sent by the base station 10 to access the network, thereby communicating with the network. Arrows shown in FIG. 1 may represent uplink/downlink transmission implemented through a cellular link between the terminal device 20 and the base station 10. In the embodiment of the disclosure, a reference signal is sent at part of specific resource locations, so that energy saving of a network device may be achieved, and interference between cells may be avoided.

Figure 2:
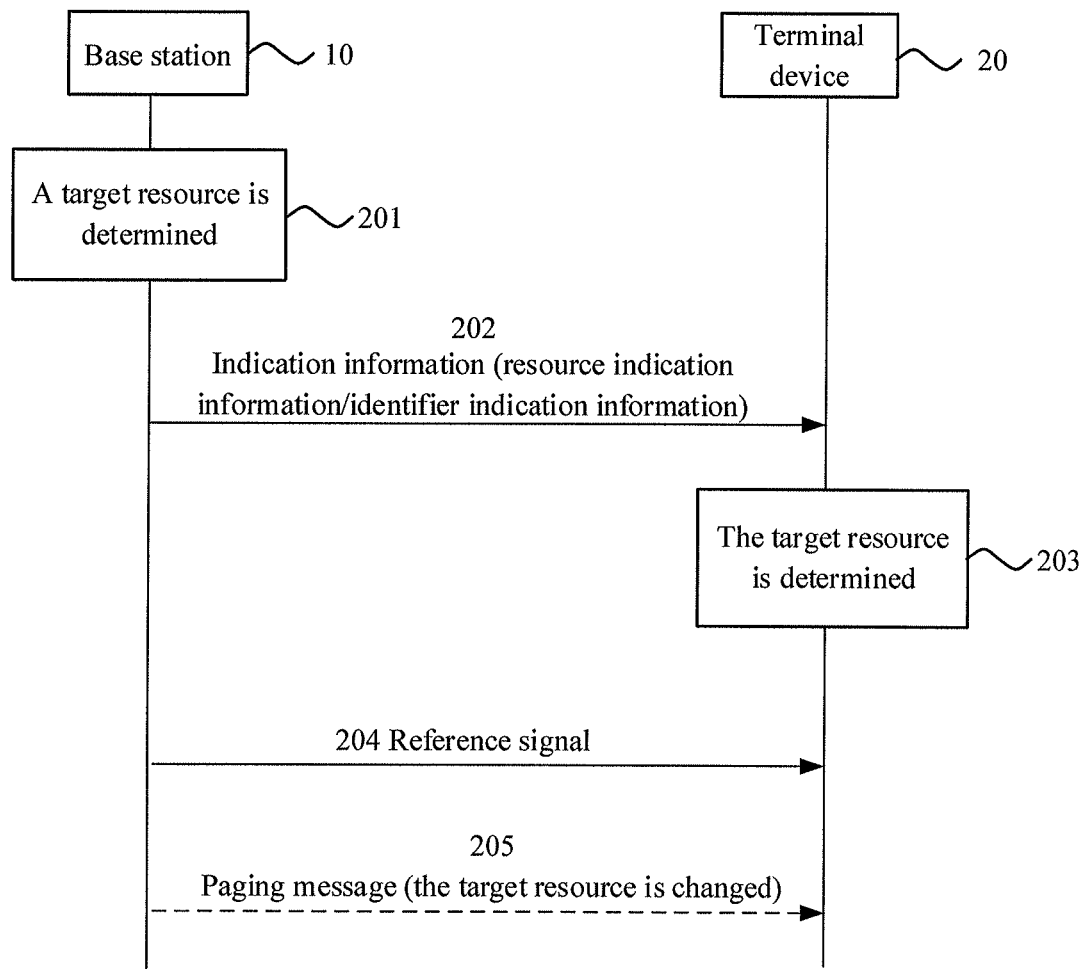
FIG. 2 is an interaction flowchart of a method for transmitting a reference signal according to an embodiment of the disclosure.

FIG. 2 is an interaction flowchart of a method for transmitting a reference signal according to an embodiment of the disclosure. A base station 10 and a terminal device 20 are shown in FIG. 2. In FIG. 2, the method executed by the base station 10 may also be executed by another network device. As shown in FIG. 2, a specific reference signal transmission flow includes the following steps.

In 201, the base station 10 determines a target resource configured to transmit a reference signal.

The operation that the base station 10 determines the target resource configured to transmit the reference signal may also refer to that the base station 10 determines a target resource configured to transmit a reference channel.

Specifically, the base station 10, before transmitting the reference signal to the mobile terminal 20, allocates a specific resource location for the reference signal and transmits the reference signal to the mobile terminal 20 at the specific resource location. Since the reference signal is sent only on part of resource locations and is not required to be sent on all downlink subframes and in a full bandwidth, energy consumption of the base station 10 may be reduced, and interference between cells is avoided.

The target resource is part of resources in transmission resources available for transmission of the reference signal.

The target resource includes at least one of a frequency-domain resource, a time-domain resource and a space-domain resource. The space-domain resource may be a multi-stream transmission mode formed in an antenna technology such as Multiple-Input Multiple-Output (MIMO). The time-domain resource may include at least one time bucket and/or at least one time point. Optionally, the at least one time bucket and/or the at least one time point are/is periodically distributed.

It should be understood that the operation that the base station 10 determines the target resource configured to transmit the reference signal may also refer to that the base station 10 determines the target resource configured to transmit the reference channel corresponding to the reference signal. Moreover, in the embodiment of the disclosure, the base station 10 may also determine a target resource configured to transmit another specific signal or specific channel. The resource transmitting the reference signal may include at least one of the frequency-domain resource, the time-domain resource and the space-domain resource.

Specifically, the base station 10 may configure at least one of the frequency-domain resource, the time-domain resource and the space-domain resource for the reference signal. Each resource item in three resource items corresponding to the frequency-domain resource, the time-domain resource and the space-domain resource optionally exists. If the base station 10 does not configure a certain resource item for the reference signal, that is, the resource item is vacant, it may be indicated that the reference signal may be freely sent on the resource represented on the resource item. For example, the reference signal is sent on the whole resource corresponding to the resource item and available for transmission of the reference signal. Or the reference signal may be sent at a specific resource location predetermined in the protocol. It should also be understood that the resource determined by the base station 10 to transmit the reference signal may also be a resource acquired by the base station according to a protocol specification to transmit the reference signal. There are no limits made thereto in the disclosure.

The reference signal may include, for example, a CRS.

Optionally, the operation that the base station 10 determines the target resource configured to transmit the reference signal includes that:

a reference identifier is determined, the reference identifier including a cell identifier or a beam identifier; and the target resource configured to transmit the reference signal is determined according to the reference identifier and a correspondence between a reference identifier and a resource identifier, the resource identifier corresponding to the target resource one to one.

Specifically, the network device may determine the resource identifier according to the reference identifier and the correspondence between the reference identifier and the resource identifier and determine the target resource corresponding to the resource identifier one to one and configured to transmit the reference signal according to the resource identifier. A correspondence between a resource identifier and a target resource may specifically refer to the following descriptions about Table 1 and Table 4.

Optionally, the correspondence between the reference identifier and the resource identifier may include i=mod(Cell ID,I) or i=mod(Beam ID,I), where i represents the resource identifier, Cell ID represents the cell identifier, Beam ID represents the beam identifier and I represents a maximum resource identifier number.

For example, if the cell identifier is Cell ID=7 and the maximum resource identifier number is I=5, the resource identifier i=2 may be calculated, and the base station 10 should transmit the reference signal to the terminal device 20 on the target resource corresponding to i=2.

For another example, if the beam identifier is Beam ID=11 and the maximum resource identifier number is I=5, the resource identifier i=1 may be calculated, and the base station 10 should transmit the reference signal to the terminal device 20 on the target resource corresponding to i=1.

It should be understood that the resource identifier determined herein may be a combined resource identifier indicating a time-domain resource identifier, a frequency-domain resource identifier and a space-domain resource identifier, may also be the time-domain resource identifier indicating the time-domain resource and may further be the frequency-domain resource identifier indicating the frequency-domain resource or the space-domain resource identifier indicating the space-domain resource. For example, the base station 10 may determine the time-domain resource identifier according to the cell identifier and then determine the frequency-domain resource identifier or the space-domain resource identifier according to a relationship between a time-domain resource identifier and a frequency-domain resource identifier or a space-domain resource identifier. There are no limits made thereto in the disclosure.

In 202, the base station 10 transmits indication information to the terminal device 20.

Specifically, the indication information may be configured to explicitly or implicitly indicate the target resource configured to transmit the reference signal to enable the terminal device 20 to acquire a location of the target resource configured to receive the reference signal according to the indication information.

For example, the base station 10 may transmit the indication information to the terminal device 20, thereby explicitly indicating the location of the target resource configured to transmit the reference signal. The base station 10 may also implicitly indicate the location of the target resource to the terminal device, and the resource identifier corresponding to the target resource is indicated to the terminal device 20 to enable the terminal device 20 to learn the target resource receiving the reference signal.

Optionally, the base station 10 may transmit the indication information to the terminal device 20, the indication information including resource indication information configured to indicate the target resource.

In the embodiment, the base station 10 may transmit the resource indication information directly indicating the target resource configured to transmit the reference signal to the terminal device to enable the terminal device 20 to directly acquire the target resource configured to transmit the reference signal through the resource indication information.

Optionally, the base station 10 transmits indication information to the terminal device 20, the indication information including identifier indication information configured to indicate the resource identifier and the resource identifier corresponding to the target resource one to one.

Specifically, the target resource configured to transmit the reference signal corresponds to the resource identifier indicating the target resource one to one. If the resource identifier of the reference signal is known, the target resource configured to transmit the reference signal may be determined according to the resource identifier. Therefore, the base station 10 may transmit the resource identifier corresponding to the target resource to the terminal device 20 to enable the terminal device 20 to acquire the target resource configured to transmit the reference signal.

Optionally, the resource identifier may include at least one of the following identifiers:

the frequency-domain resource identifier configured to indicate the frequency-domain resource, the time-domain resource identifier configured to indicate the time-domain resource and a time-domain resource period, the space-domain resource identifier configured to indicate the space-domain resource or the combined resource identifier configured to indicate at least two resources in the frequency-domain resource, the time-domain resource and the space-domain resource.

Specifically, the resource identifier may include at least one resource identifier. The combined resource identifier may include a combination of at least two resource locations in the frequency-domain resource, the time-domain resource and the space-domain resource. For example, the resource identifier may include the frequency-domain resource identifier, the time-domain resource identifier and the space-domain resource identifier, or includes the combined resource identifier simultaneously indicating the frequency-domain resource, the time-domain resource and the space-domain resource, or includes the space-domain resource identifier and a combined resource identifier indicating the frequency-domain resource and the time-domain resource.

The correspondence between the target resource and the resource identifier in the embodiment of the disclosure will be illustrated below in combination with Table 1 to Table 4. Table 1 is a correspondence between each of a frequency-domain resource, a time-domain resource and a space-domain resource and a combined resource identifier.

TABLE 1

| Resource identifier | Frequency-domain resource | Time-domain resource | Space-domain resource |
|---|---|---|---|
| 0 | $D_{f1}, D_{f3}$ | $D_{t1} (T_1)$ | $L_1$ |
| 1 | $D_{f2}$ | $D_{t1} (T_1)$ | $L_1$ |
| 2 | $D_{f1}, D_{f3}$ | $D_{t1} (T_2)$ | $L_2$ |
| 3 | $D_{f1}$ | $D_{t2} (T_1)$ | $L_2$ |
| ... | ... | ... | ... |
| i | $D_{fi}$ | $D_{ti}$ | $L_i$ |
| ... | ... | ... | ... |
| I − 1 | $D_{fm}$ | $D_{tn} (T_n)$ | $L_k$ |

The combined identifier in Table 1 may include 0,1,2,3 . . . I−1, where I is a natural number. Each identifier number corresponds to a specific frequency-domain resource, time-domain resource and space-domain resource.

The second column in Table 1 represents the frequency-domain resource. $D_{fi}$ represents a continuous interval, i.e., a specific frequency band range, in the frequency-domain resource. i is an integer more than or equal to 1 and less than or equal to m. m is the total number of sub-resources obtained by dividing the whole frequency-domain resource. For example, when m=5, it is indicated that the whole frequency-domain resource is divided into 5 frequency-domain sub-resources and a frequency-domain resource location corresponding to each frequency-domain sub-resource is different.

The third column in Table 1 represents the time-domain resource. The time-domain resource may include the specific time bucket and/or the specific time point and a time-domain resource period T. $D_{ti}$ represents a continuous interval, i.e., an identifier of a specific time bucket or an identifier of a specific time point, in the time-domain resource. i is an integer more than or equal to 1 and less than or equal to n. n is the total number of sub-resources obtained by dividing the fixed time-domain resource. It should be understood that each time-domain resource period may include at least one time bucket and/or at least one time point which are/is periodically distributed.

For example, if the time-domain resource period is $T_1$=10 ms, n=10 and the identifier of the time point is $D_{ti}$=2, the base station 10, in such case, may transmit the reference signal at the second ms in every 10 ms. If the time-domain resource period is $T_1$=5 ms, n=5 and the identifier of the time point is i=3, the base station 10, in such case, may transmit the reference signal at the third ms in every 5 ms. If the time-domain resource period is $T_2$=14 ms, n=2, the time period is divided into two time buckets, i.e., a time bucket 10 (0~7 ms) and a time bucket 20 (7~14 ms) respectively, and the identifier of the time bucket is $D_{ti}$=20, the base station 10, in such case, may transmit the reference signal at the seventh ms~14th ms in every 14 ms. If the time-domain resource period is $T_2$=10 ms, n=3, the time period is divided into three time buckets, i.e., a time bucket 10 (0~2 ms), a time bucket 20 (4~6 ms) and a time bucket 30 (8~10 ms) respectively, and the identifier of the time bucket is i=30, the base station 10, in such case, may transmit the reference signal at the eighth ms~tenth ms in every 10 ms. Particularly, T=10 ms may also represent 10 subframes (each subframe is 1 ms) in a radio frame. A value of $D_{ti}$ represents a serial number of the subframe on which the reference signal is sent in the radio frame.

Information of the time-domain resource period may be carried in information of the time-domain resource identifier and may also be independently configured or specified in the protocol.

The fourth column in Table 1 represents the space-domain resource. The space-domain resource is represented through a layer (abbreviated as L). $L_i$ represents the ith space-domain resource and i is an integer more than or equal to 1 and less than or equal to k. k is the total number of layers into which the whole space-domain resource is divided. For example, when m=5, it is indicated that the whole space-domain resource is divided into 5 layers.

For example, the frequency-domain resource identifier corresponding to an identifier number 0 includes $D_{f1}$ and $D_{f3}$, the time-domain resource corresponding to the identifier 0 includes the time bucket $D_{t1}$ in the period $T_1$ and the space-domain resource corresponding to the identifier includes $L_1$. The base station 10, responsive to determining the resource identifier of the reference signal, may determine the target resource corresponding to the resource identifier one to one, thereby transmitting the reference signal to the terminal device 20 on the target resource (the frequency-domain resource, the time-domain resource and the space-domain resource), namely transmitting the reference signal to the terminal device on frequency bands $D_{f1}$ and $D_{f3}$, the time bucket $D_{t1}$ and the layer $L_1$.

A combination of some resources is represented by a specific resource identifier above. In addition, any resource may also be represented by a specific resource identifier. For example, the frequency-domain resource, the time-domain resource and the space-domain resource correspond to respective resource identifiers respectively. Table 2, Table 3 and Table 4 show a correspondence between a frequency-domain resource and a frequency-domain resource identifier, a correspondence between a time-domain resource and a time-domain resource identifier and a correspondence between a space-domain resource and a space-domain resource identifier respectively.

TABLE 2

| Resource identifier | Frequency-domain resource |
|---|---|
| 0 | $D_{f1}$ |
| 1 | $D_{f2}$ |
| ... | ... |
| i | $D_{fi}$ |
| ... | ... |
| $I_f - 1$ | $D_{fI}$ |

TABLE 3

| Resource identifier | Time-domain resource |
|---|---|
| 0 | $D_{t1}$ |
| 1 | $D_{t2}$ |
| ... | ... |
| i | $D_{ti}$ |
| ... | ... |
| $I_t - 1$ | $D_{tI}$ |

TABLE 4

| Resource identifier | Space-domain resource |
|---|---|
| 0 | $L_1$ |
| 1 | $L_1$ |
| ... | ... |
| i | $L_i$ |
| ... | ... |
| $I_l - 1$ | $L_k$ |

$I_f-1$, $I_t-1$ and $I_l-1$ represent a maximum resource identifier number of the frequency-domain resource identifier, a maximum resource identifier number of the time-domain resource identifier and a maximum resource identifier number of the space-domain resource identifier. Meanings of the symbols in Table 2, Table 3 and Table 4 may refer to the descriptions about Table 1 and will not be elaborated herein for simplicity.

It should be understood that a mapping relationship between a target resource and a resource identifier may be configured through a network side and may also be predefined in the protocol. There are no limits made thereto in the disclosure.

The correspondence, described above, between the target resource and the resource identifier is only exemplary. The correspondence between the resource identifier and the target resource may also be determined in another manner. For example, the operation in 201 that the network device determines the target resource configured to transmit the reference signal may also refer to that the target resource is determined according to the resource identifier corresponding to any resource in the target resource.

For example, the base station 10 may determine the frequency-domain resource identifier and the space-domain resource identifier according to the time-domain resource identifier, thereby determining the target resource according to the time-domain resource identifier, the frequency-domain resource identifier and the space-domain resource identifier. Or the base station 10 may determine the time-domain resource identifier and the space-domain resource identifier according to the frequency-domain resource identifier, thereby determining the target resource according to the time-domain resource identifier, the frequency-domain resource identifier and the space-domain resource identifier. Or the base station 10 may determine the time-domain resource identifier and the frequency-domain resource identifier according to the space-domain resource identifier, thereby determining the target resource according to the time-domain resource identifier, the frequency-domain resource identifier and the space-domain resource identifier.

It should be understood that the base station 10 may also determine only two resource identifiers, for example, determining the space-domain resource identifier according to the time-domain resource identifier, and leave the frequency-domain resource identifier vacant. The vacant resource item may indicate that the reference signal may be sent in the full bandwidth or sent at the frequency-domain resource location predetermined in the protocol. There are no limits made thereto in the disclosure.

Optionally, when the resource identifier includes the time-domain resource identifier, the operation that the network device 10 determines the target resource configured to transmit the reference signal includes that:

the network device 20 determines the frequency-domain resource configured to transmit the reference signal according to any one of the following correspondences: $i_f$=mod$(RN,I_f)$, $i_f$=mod$(P_i,I_f)$, $i_f$=$(Dt_i,I_f)$ or $i_f$=mod$(i_t,I_f)$; and/or the network device 20 determines the space-domain resource configured to transmit the reference signal according to any one of the following correspondences: $i_l$=mod$(RN,I_l)$, $i_l$=mod$(P_i,I_l)$, $i_l$=$(Dt_i,I_l)$ or $i_l$=mod$(i_t,I_l)$.

RN represents a resource serial number of the time-domain resource in the time-domain resource period, $P_i$ represents a serial number of the time-domain resource period, $Dt_i$ represents a time bucket or time point corresponding to the time-domain resource in the time-domain resource period, $i_t$ represents the time-domain resource identifier, $i_f$ represents the frequency-domain resource identifier, $i_l$ represents the space-domain resource identifier, $I_f$ represents the maximum frequency-domain resource identifier number and $I_l$ represents the maximum space-domain resource identifier number.

The resource serial number RN of the time-domain resource in the time-domain resource period may include a serial number of a radio frame such as an SFN, a subframe number and a time slot number. There are no limits made thereto in the disclosure.

For example, the identifier indication information sent to the terminal device 20 by the base station 10 may include the time-domain resource identifier. For example, the time-domain resource identifier may be the resource serial number of the time-domain resource in the time-domain resource period. If the resource serial number RN is a corresponding SFN, SFN=11 and the identifier indication information includes the time-domain resource identifier but does not include the frequency-domain resource identifier, the base station 10 may determine the frequency-domain resource identifier according to $i_f$=mod$(SFN,I_f)$. For example, when the maximum frequency-domain resource identifier number is $I_f$=5, the frequency-domain resource identifier is $i_f$=1 and the base station 10 should transmit the reference signal to the terminal device 20 on the frequency-domain resource corresponding to SFN=11 and $i_f$=1.

If the identifier indication information includes the time-domain resource identifier but does not include the space-domain resource identifier, the base station 10 may determine the space-domain resource identifier according to $i_l$=mod$(SFN,I_l)$. For example, when the maximum space-domain resource identifier number is $I_l$=3, the space-domain resource identifier is $i_l$=2 and the base station 10 should transmit the reference signal to the terminal device 20 on the space-domain resource corresponding to SFN=11 and $i_f$=2.

Of course, if the identifier indication information includes the time-domain resource identifier but does not include the frequency-domain resource identifier and the space-domain resource identifier, the base station 10 may determine the frequency-domain resource identifier and the space-domain resource identifier according to $i_f$=mod(SFN,$I_f$) and $i_l$=mod(SFN,$I_l$).

For another example, the base station 10 may determine the frequency-domain resource identifier and the space-domain resource identifier according to $i_f$=mod($P_i$,$I_f$) and $i_l$=mod($P_i$,$I_l$). If the serial number of the period where the time-domain resource is located is $P_i$=12, the frequency-domain resource identifier is $i_f$=2 when the maximum frequency-domain resource identifier number is $I_f$=5 and the space-domain resource identifier is $i_l$=0 when the maximum space-domain resource identifier number is $I_l$=3, the base station 10 should transmit the reference signal to the terminal device 20 in the time-domain resource period corresponding to $P_i$=12 and on the frequency-domain resource $i_f$=2 corresponding to and the space-domain resource corresponding to $i_l$=0.

For another example, if a specific time point or time bucket in a certain period where the time-domain resource is located is $Dt_i$=11, the base station 10 may determine the frequency-domain resource identifier and the space-domain resource identifier according to $i_f$=mod($Dt_i$,$I_f$) and $i_l$=mod($Dt_i$,$I_l$). The frequency-domain resource identifier is $i_f$=1 when the maximum frequency-domain resource identifier number is $I_f$=5, the space-domain resource identifier is $i_l$=2 when the maximum space-domain resource identifier number is $I_l$=3, and the base station 10 should transmit the reference signal to the terminal device 20 on the time-domain resource corresponding to $Dt_i$=11, the frequency-domain resource corresponding to $i_f$=1 and the space-domain resource corresponding to $i_l$=2.

For another example, the resource identifier may directly include the time-domain resource identifier. If the time-domain resource identifier is $i_t$=13, the base station 10 may determine the frequency-domain resource identifier and the space-domain resource identifier according to $i_f$=mod($i_t$,$I_f$) and $i_l$=mod($i_t$,$I_l$). The frequency-domain resource identifier is $i_f$=3 when the maximum frequency-domain resource identifier number is $I_f$=5, the space-domain resource identifier is $i_l$=1 when the maximum space-domain resource identifier number is $I_l$=3, and the base station 10 should transmit the reference signal to the terminal device 20 on the time-domain resource corresponding to $i_t$=13, the frequency-domain resource corresponding to $i_f$=3 and the space-domain resource corresponding to $i_l$=1.

Optionally, when the resource identifier includes the frequency-domain resource identifier, the operation that the base station 10 determines the target resource configured to transmit the reference signal includes that:

the time-domain resource configured to transmit the reference signal is determined according to $i_t$=mod($i_f$,$I_t$); and/or the space-domain resource configured to transmit the reference signal is determined according to $i_l$=mod($i_f$,$I_l$).

$i_t$ represents the time-domain resource identifier, $I_t$ represents the maximum time-domain resource identifier number, $i_f$ represents the frequency-domain resource identifier, $I_l$ represents the maximum space-domain resource identifier number and $i_l$ represents the space-domain resource identifier.

For example, the identifier indication information sent to the terminal device 20 by the base station 10 may include the frequency-domain resource identifier. If the identifier indication information includes the frequency-domain resource identifier but does not include the time-domain resource identifier, the base station 10 may determine the time-domain resource identifier according to $i_t$=mod($i_f$,$I_t$). If the identifier indication information includes the frequency-domain resource identifier but does not include the space-domain resource identifier, the base station 10 may determine the space-domain resource identifier according to $i_l$=mod($i_f$,$I_l$). If the identifier indication information includes the frequency-domain resource identifier but does not include the time-domain resource identifier and the space-domain resource identifier, the base station 10 may determine both of the time-domain resource identifier and the space-domain resource identifier according to $i_t$=mod($i_f$,$I_t$) and according to $i_l$=mod($i_f$,$I_l$). If the frequency-domain resource identifier is $i_f$=13 the base station 10 determines the time-domain resource identifier and the space-domain resource identifier according to $i_t$=mod($i_f$,$I_t$) and $i_l$=mod($i_f$,$I_l$). The time-domain resource identifier is $i_t$=3 when the maximum time-domain resource identifier number is $I_t$=5, the space-domain resource identifier is $i_l$=1 when the maximum space-domain resource identifier number is $I_l$=3, and the base station 10 should transmit the reference signal to the terminal device 20 on the time-domain resource corresponding to $i_t$=3, the frequency-domain resource corresponding to $i_f$=13 and the space-domain resource corresponding to $i_l$=1.

Optionally, when the resource identifier includes the space-domain resource identifier, the operation that the base station 10 determines the target resource configured to transmit the reference signal includes that:

the time-domain resource configured to transmit the reference signal is determined according to $i_t$=mod($i_l$,$I_t$); and/or the frequency-domain resource configured to transmit the reference signal is determined according to $i_f$=mod($i_l$,$I_f$).

$i_t$ represents the time-domain resource identifier, $I_t$ represents the maximum time-domain resource identifier number, $i_f$ represents the frequency-domain resource identifier, $I_f$ represents the maximum frequency-domain resource identifier number and $i_l$ represents the space-domain resource identifier.

For example, the resource indication information sent to the terminal device 20 by the base station 10 may further include the space-domain resource identifier but does not include the time-domain resource identifier and/or the frequency-domain resource identifier. If the space-domain resource identifier is $i_l$=13, the base station 10 may determine the time-domain resource identifier and the space-domain resource identifier according to $i_t$=mod($i_l$,$I_t$) or $i_f$=mod($i_l$,$I_f$). The time-domain resource identifier is $i_t$=3 when the maximum time-domain resource identifier number is $I_t$=5, the frequency-domain resource identifier is $i_f$=1 when the maximum frequency-domain resource identifier number is $I_f$=3, and the base station 10 transmits the reference signal to the terminal device 20 on the time-domain resource corresponding to $i_t$=3, the frequency-domain resource corresponding to $i_f$=1 and the space-domain resource corresponding to $i_l$=13.

It should be understood that the correspondence between any resource identifier and another resource identifier may be predetermined in the protocol or determined and notified to the terminal device 20 by the base station 10.

It should also be understood that the correspondence, predetermined according to the protocol or determined by the base station 10, between any resource identifier and another resource identifier may also include an explicit correspondence between each resource identifier. There are no limits made thereto in the disclosure.

Optionally, the operation that the base station 10 transmits the indication information to the terminal device 20 includes that:

the base station 10 transmits the indication information carried in high-layer signaling, physical-layer signaling or a MAC-layer notification to the terminal device 20.

Specifically, the base station 10 transmits the high-layer signaling to the mobile terminal 20 to explicitly or implicitly indicate the target resource configured to transmit the reference signal through the resource indication information or identifier indication information in the high-layer signaling. For example, the resource indication information indicating the target resource or the identifier indication information indicating the resource identifier is contained in a master information block or the resource indication information or the identifier indication information is contained in a system information block. The base station 10 may also transmit the physical-layer signaling to the mobile terminal 20 to explicitly or implicitly indicate the target resource through the resource indication information or identifier indication information in the physical-layer signaling. For example, the resource indication information or the identifier indication information is contained in a physical control channel or a dedicated physical channel is determined to transmit the resource indication information or the identifier indication information. In addition, the base station 10 may further transmit the MAC-layer notification to the mobile terminal 20 to notify the terminal device 20 of the target resource configured to receive the reference signal through the resource indication information or identifier indication information in the MAC-layer notification.

In 203, the terminal device 20 determines the target resource configured to transmit the reference signal.

The operation that the terminal device 20 determines the target resource configured to transmit the reference signal may also refer to that the terminal device 20 determines the target resource configured to transmit the reference channel.

Specifically, the terminal device 20, after receiving the indication information sent by the base station 10, may directly acquire the resource location of the reference signal according to the indication information or acquire the resource identifier according to the indication information and determine the location of the corresponding target resource according to the resource identifier. The terminal device 20, after determining the target resource configured to transmit the reference signal, may receive the reference signal sent by the base station 10 on the target resource and demodulate and process the signal, thereby using the reference signal for channel estimation or channel detection.

It should be understood that the terminal device 20, if receiving the resource indication information indicating the target resource, directly receives the reference signal sent by the base station 10 on the target resource indicated by the resource indication information. The terminal device 20, if receiving the identifier indication information indicating the resource identifier, is required to acquire the resource identifier in the identifier indication information, thereby determining the target resource according to the resource identifier. For example, the other resource identifier is determined according to the resource identifier and the relationship between the resource identifier and another resource identifier, thereby acquiring the target resource.

It should also be understood that the terminal device 20, after acquiring the resource identifier, is required to determine the target resource corresponding to the resource identifier according to the correspondence between the resource identifier and the target resource. The correspondence between the resource identifier and the target resource may be acquired by the terminal device 20 according to the protocol, and may also be sent to the terminal device 20 by the base station 10. For example, information of the correspondence is sent to multiple terminal devices within coverage in a broadcast manner, or the information of the correspondence is only sent to the terminal device 20. For example, at least one correspondence in Table 1 to Table 4 may be sent.

Optionally, the terminal device 20 may determine the frequency-domain resource configured to transmit the reference signal according to any one of the following correspondences: $i_f=\mathrm{mod}(RN,I_f)$, $i_f=\mathrm{mod}(P_i,I_f)$, $i_f=\mathrm{mod}(Dt_i,I_f)$ and $i_f=\mathrm{mod}(i_r,I_f)$, and/or determine the space-domain resource configured to transmit the reference signal according to any one of the following correspondences: $i_l=\mathrm{mod}(RN,I_l)$, $i_l=\mathrm{mod}(P_i,I_l)$, $i_l=\mathrm{mod}(Dt_i,I_l)$ and $i_l=\mathrm{mod}(i_r,I_l)$.

Optionally, the terminal device 20 may determine the time-domain resource configured to transmit the reference signal according to $i_r=\mathrm{mod}(i_p,I_r)$ and/or determine the space-domain resource configured to transmit the reference signal according to $i_l=\mathrm{mod}(i_p,I_l)$.

Optionally, the terminal device 20 may determine the time-domain resource identifier configured for transmission of the reference signal according to $i_r=\mathrm{mod}(i_p,I_r)$ and/or determine the frequency-domain resource identifier configured for transmission of the reference signal according to $i_f=\mathrm{mod}(i_p,I_f)$.

It is to be noted that a process that the terminal device 20 determines the target resource according to the resource identifier may specifically refer to a process that the base station 10 determines the target resource and will not be elaborated herein for simplicity.

In 204, the base station 10 transmits the reference signal to the terminal device 20 on the target resource.

The operation that the base station 10 transmits the reference signal to the terminal device 20 on the target resource may also refer to that the base station 10 transmits the reference channel to the terminal device 20 on the target resource.

Specifically, the base station 10, after determining the target resource, transmits the reference signal or the reference channel corresponding to the reference signal to the terminal device 20 on the target resource. Correspondingly, the terminal device 20, after determining the target resource according to the indication information sent by the base station 10, receives the reference signal sent by the base station 10 on the target resource.

It should be understood that 204 may also be executed before 202. That is, the base station 10 transmits the reference signal to the terminal device 20 at first and then transmits the indication information. There are no limits made thereto in the disclosure.

Optionally, if the target resource is changed, the method may further include 205.

In 205, the base station 10 transmits a paging message to the terminal device 20.

The paging message may include information of the changed target resource or an indication message configured to indicate that the target resource is changed.

That is, the target resource for the reference signal may be determined and may also be regulated at any time according to a network condition and the like. When the location of the target resource is required to be changed, the base station 10 transmits the paging message indicating that the target resource is changed to the terminal device 20.

The paging message may directly contain resource configuration information, i.e., location information of the changed target resource. The terminal device 20, after receiving the paging message, directly receives the reference signal on a resource configuration contained in the paging message. The paging message may also contain the indication message indicating that the target resource is changed. The terminal device 20, after receiving the paging message, may read the master information block or a specific system information block to acquire the target resource.

Optionally, the operation that the base station 10 transmits the paging message to the terminal device 20 includes that:

the base station 10 transmits the paging message carried in high-layer signaling, physical-layer signaling or a MAC-layer notification to the terminal device 20.

It should be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

The method for transmitting the reference signal according to the embodiments of the disclosure is described above in detail. A network device and terminal device according to the embodiments of the disclosure will be described below. It should be understood that the network device and terminal device of the embodiments of the disclosure may execute various methods in the abovementioned embodiments of the disclosure. That is, the following specific working process of each device may refer to the corresponding process in the method embodiments.

Figure 3:
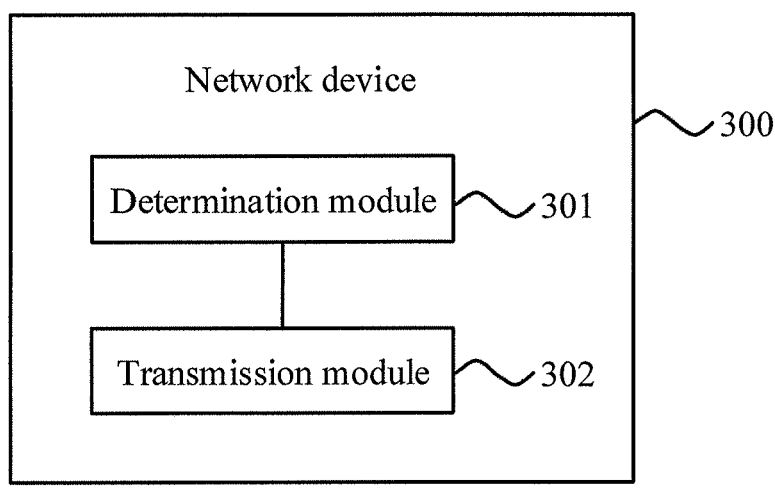
FIG. 3 is a structure block diagram of a network device according to an embodiment of the disclosure.

FIG. 3 is a schematic block diagram of a network device 300 according to an embodiment of the disclosure. As shown in FIG. 3, the network device 300 includes a determination module 301 and a transmitting module 302.

The determination module 301 is configured to determine a target resource configured to transmit a reference signal, the target resource being part of resources in transmission resources available for transmission of the reference signal and the target resource including at least one of a frequency-domain resource, a time-domain resource and a space-domain resource.

The transmitting module 302 is configured to transmit the reference signal to a terminal device on the target resource determined by the determination module 301.

Optionally, the determination module 301 is specifically configured to:

determine a reference identifier, the reference identifier including a cell identifier or a beam identifier; and determine the target resource configured to transmit the reference signal according to the reference identifier and a correspondence between a reference identifier and a resource identifier, the resource identifier corresponding to the target resource one to one.

Optionally, the correspondence between the reference identifier and the resource identifier may include $i=\mod(\text{Cell ID}, I)$ or $i=\mod(\text{Beam ID}, I)$, where $i$ represents the resource identifier, Cell ID represents the cell identifier, Beam ID represents the beam identifier and $I$ represents a maximum resource identifier number.

Optionally, the transmitting module 302 is further configured to:

transmit indication information to the terminal device, the indication information including resource indication information configured to indicate the target resource.

Optionally, the transmitting module 302 is further configured to:

transmit indication information to the terminal device, the indication information including identifier indication information configured to indicate the resource identifier and the resource identifier corresponding to the target resource one to one.

Optionally, the resource identifier includes at least one of the following identifiers:

a frequency-domain resource identifier configured to indicate the frequency-domain resource, a time-domain resource identifier configured to indicate the time-domain resource and a time-domain resource period, a space-domain resource identifier configured to indicate the space-domain resource or a combined resource identifier configured to indicate at least two resources in the frequency-domain resource, the time-domain resource and the space-domain resource.

Optionally, when the resource identifier includes the time-domain resource identifier, the determination module 301 is specifically configured to:

determine the frequency-domain resource configured to transmit the reference signal according to any one of the following correspondences: $i_f=\mod(RN, I_f)$, $i_f=\mod(P_i, I_f)$, $i_f=\mod(Dt_i, I_f)$ or $i_f=\mod(i_t, I_f)$; and/or determine the space-domain resource configured to transmit the reference signal according to any one of the following correspondences: $i_l=\mod(RN, I_l)$, $i_l=\mod(P_i, I_l)$, $i_l=\mod(Dt_i, I_l)$ or $i_l=\mod(i_t, I_l)$.

RN represents a resource serial number of the time-domain resource in the time-domain resource period, $P_i$ represents a serial number of the time-domain resource period, $Dt_i$ represents a time bucket or time point corresponding to the time-domain resource in the time-domain resource period, $i_t$ represents the time-domain resource identifier, $i_f$ represents the frequency-domain resource identifier, $i_l$ represents the space-domain resource identifier, $I_f$ represents a maximum frequency-domain resource identifier number and $I_l$ represents a maximum space-domain resource identifier number.

Optionally, when the resource identifier includes the frequency-domain resource identifier, the determination module 301 is specifically configured to:

determine the time-domain resource configured to transmit the reference signal according to $i_t=\mod(i_f, I_t)$; and/or determine the space-domain resource configured to transmit the reference signal according to $i_l=\mod(i_f, I_l)$.

$i_t$ represents the time-domain resource identifier, $I_t$ represents a maximum time-domain resource identifier number, $i_f$ represents the frequency-domain resource identifier, $I_l$ represents the maximum space-domain resource identifier number and $i_l$ represents the space-domain resource identifier.

Optionally, when the resource identifier includes the space-domain resource identifier, the determination module 301 is specifically configured to:

determine the time-domain resource configured to transmit the reference signal according to $i_t=\mod(i_l, I_t)$; and/or determine the frequency-domain resource configured to transmit the reference signal according to $i_f=\mod(i_l, I_f)$.

$i_t$ represents the time-domain resource identifier, $I_t$ represents the maximum time-domain resource identifier number, $i_f$ represents the frequency-domain resource identifier, $I_f$ represents the maximum frequency-domain resource identifier number and $i_l$ represents the space-domain resource identifier.

Optionally, the transmitting module 302 is specifically configured to transmit the indication information carried in high-layer signaling, physical-layer signaling or a MAC-layer notification to the terminal device.

Figure 4:
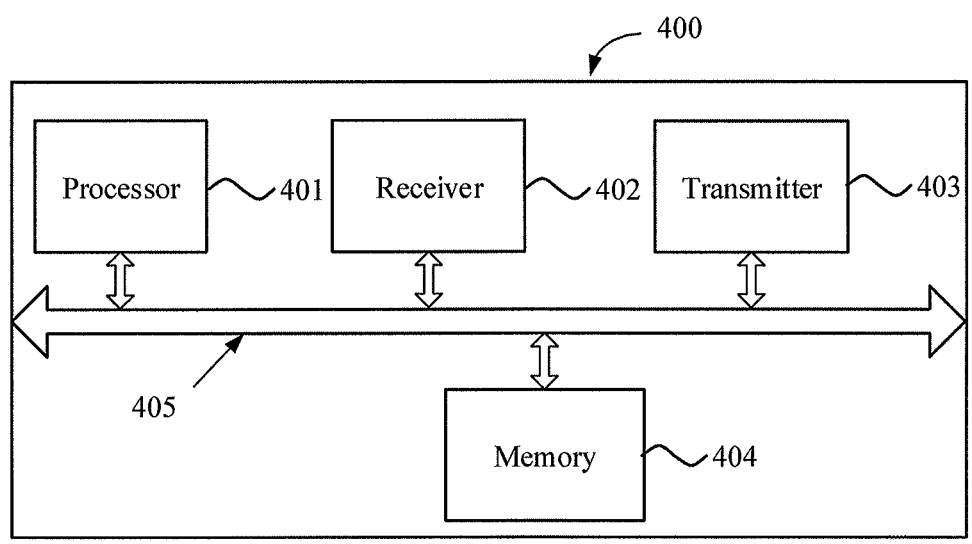
FIG. 4 is another structure block diagram of a network device according to an embodiment of the disclosure.

It is to be noted that, in the embodiment of the disclosure, the determination module 301 may be implemented by a processor and the transmitting module 302 may be implemented by a transmitter. As shown in FIG. 4, a network device 400 may include a processor 401, a receiver 402, a transmitter 403 and a memory 404. The memory 404 may be configured to store location information, resource identifier and the like of a reference signal and may further be configured to store a code executed by the processor 401 and the like. Each component in the network device 400 is coupled together through a bus system 405. The bus system 405 includes a data bus, and further includes a power bus, a control bus and a state signal bus. The processor 401 is specifically configured to:

determine a target resource configured to transmit the reference signal, the target resource being part of resources in transmission resources available for transmission of the reference signal and the target resource including at least one of a frequency-domain resource, a time-domain resource and a space-domain resource.

The transmitter 403 is configured to transmit the reference signal to a terminal device on the target resource determined by a determination module.

Optionally, the processor 401 is specifically configured to:

determine a reference identifier, the reference identifier including a cell identifier or a beam identifier; and determine the target resource configured to transmit the reference signal according to the reference identifier and a correspondence between a reference identifier and a resource identifier, the resource identifier corresponding to the target resource one to one.

Optionally, the correspondence between the reference identifier and the resource identifier may include i=mod(Cell ID,I) or i=mod(Beam ID,I), where i represents the resource identifier, Cell ID represents the cell identifier, Beam ID represents the beam identifier and I represents a maximum resource identifier number.

Optionally, the transmitter 403 is further configured to:

transmit indication information to the terminal device, the indication information including resource indication information configured to indicate the target resource.

Optionally, the transmitter 403 is further configured to:

transmit indication information to the terminal device, the indication information including identifier indication information configured to indicate the resource identifier and the resource identifier corresponding to the target resource one to one.

Optionally, the resource identifier includes at least one of the following identifiers:

a frequency-domain resource identifier configured to indicate the frequency-domain resource, a time-domain resource identifier configured to indicate the time-domain resource and a time-domain resource period, a space-domain resource identifier configured to indicate the space-domain resource or a combined resource identifier configured to indicate at least two resources in the frequency-domain resource, the time-domain resource and the space-domain resource.

Optionally, when the resource identifier includes the time-domain resource identifier, the processor 401 is specifically configured to:

determine the frequency-domain resource configured to transmit the reference signal according to any one of the following correspondences: $i_f=\mathrm{mod}(RN,I_f)$, $i_f=\mathrm{mod}(P_i,I_f)$, $i_f=\mathrm{mod}(Dt_i,I_f)$ or $i_f=\mathrm{mod}(i_t,I_f)$; and/or determine the space-domain resource configured to transmit the reference signal according to any one of the following correspondences: $i_l=\mathrm{mod}(RN,I_l)$, $i_l=\mathrm{mod}(P_i,I_l)$, $i_l=\mathrm{mod}(Dt_i,I_l)$ or $i_l=\mathrm{mod}(i_t,I_l)$.

RN represents a resource serial number of the time-domain resource in the time-domain resource period, $P_i$ represents a serial number of the time-domain resource period, $Dt_i$ represents a time bucket or time point corresponding to the time-domain resource in the time-domain resource period, $i_t$ represents the time-domain resource identifier, $i_f$ represents the frequency-domain resource identifier, $i_l$ represents the space-domain resource identifier, $I_f$ represents a maximum frequency-domain resource identifier number and $I_l$ represents a maximum space-domain resource identifier number.

Optionally, when the resource identifier includes the frequency-domain resource identifier, the processor 401 is specifically configured to:

determine the time-domain resource configured to transmit the reference signal according to $i_t=\mathrm{mod}(i_f,I_t)$; and/or determine the space-domain resource configured to transmit the reference signal according to $i_l=\mathrm{mod}(i_f,I_l)$.

$i_t$ represents the time-domain resource identifier, $I_t$ represents a maximum time-domain resource identifier number, $i_f$ represents the frequency-domain resource identifier, $I_l$ represents the maximum space-domain resource identifier number and $i_l$ represents the space-domain resource identifier.

Optionally, when the resource identifier includes the space-domain resource identifier, the processor 401 is specifically configured to:

determine the time-domain resource configured to transmit the reference signal according to $i_t=\mathrm{mod}(i_l,I_t)$; and/or determine the frequency-domain resource configured to transmit the reference signal according to $i_f=(i_l,I_f)$.

$i_t$ represents the time-domain resource identifier, $I_t$ represents the maximum time-domain resource identifier number, $i_f$ represents the frequency-domain resource identifier, $I_f$ represents the maximum frequency-domain resource identifier number and $i_l$ represents the space-domain resource identifier.

Optionally, the transmitter 403 is specifically configured to transmit the indication information carried in high-layer signaling, physical-layer signaling or a MAC-layer notification to the terminal device.

Figure 5:
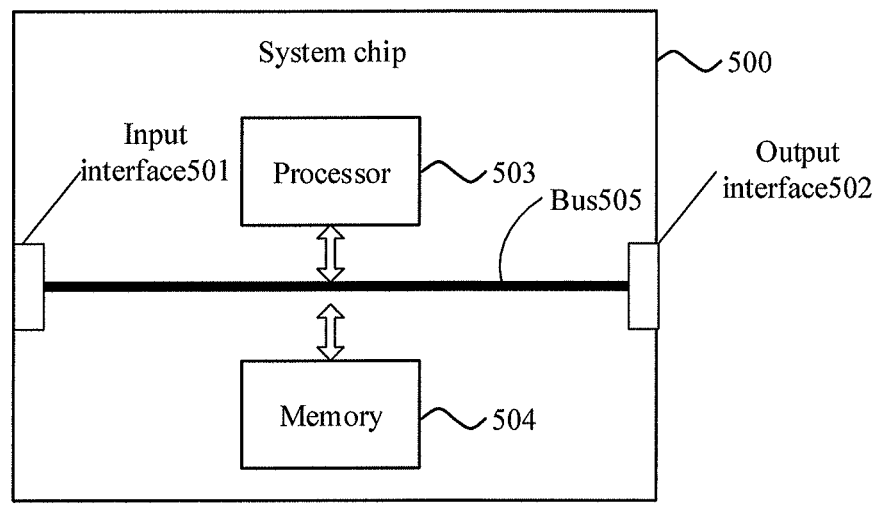
FIG. 5 is a schematic structure diagram of a system chip according to an embodiment of the disclosure.

FIG. 5 is a schematic structure diagram of a system chip according to an embodiment of the disclosure. The system chip 500 of FIG. 5 includes an input interface 501, an output interface 502, at least one processor 503 and a memory 504. The input interface 501, the output interface 502, the processor 503 and the memory 504 are connected through a bus 505. The processor 503 is configured to execute a code in the memory 504. When the code is executed, the processor 503 implements the method executed by a base station 10 or terminal device 20 in FIG. 2.

The network device 300 shown in FIG. 3 or the network device 40 shown in FIG. 400 or the system chip 500 shown in FIG. 5 may implement each process implemented by the base station 10 or the terminal device 20 in the method embodiment of FIG. 2. No more elaborations will be made herein to avoid repetitions.

Figure 6:
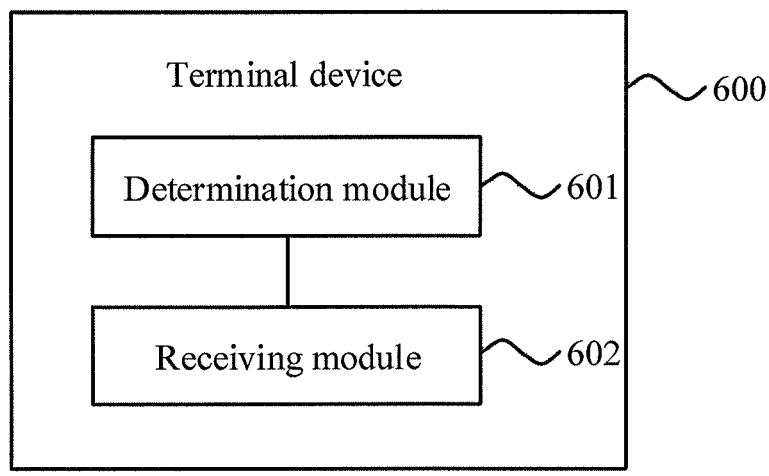
FIG. 6 is a structure block diagram of a terminal device according to an embodiment of the disclosure.

FIG. 6 is a schematic block diagram of a terminal device 600 according to an embodiment of the disclosure. As shown in FIG. 6, the network device 600 includes a determination module 601 and a receiving module 602.

The determination module 601 is configured to determine a target resource configured to transmit a reference signal, the target resource being part of resources in transmission resources available for transmission of the reference signal and the target resource including at least one of a frequency-domain resource, a time-domain resource and a space-domain resource.

The receiving module 602 is configured to receive the reference signal sent by a network device on the target resource determined by the determination module 601.

Optionally, the determination module 601 is specifically configured to:

determine a reference identifier, the reference identifier including a cell identifier or a beam identifier; and determine the target resource configured to transmit the reference signal according to the reference identifier and a correspondence between a reference identifier and a resource identifier, the resource identifier corresponding to the target resource one to one.

Optionally, the correspondence between the reference identifier and the resource identifier may include i=mod(Cell ID,I) or i=mod(Beam ID,I), where i represents the resource identifier, Cell ID represents the cell identifier, Beam ID represents the beam identifier and I represents a maximum resource identifier number.

Optionally, the receiving module 602 is specifically configured to:

receive indication information sent by the network device, the indication information including resource indication information configured to indicate the target resource.

Optionally, the receiving module 602 is further configured to:

receive indication information sent by the network device, the indication information including identifier indication information configured to indicate a resource identifier.

The determination module is further configured to determine the target resource corresponding to the resource identifier one to one according to the identifier indication information.

Optionally, the resource identifier includes at least one of the following identifiers:

a frequency-domain resource identifier configured to indicate the frequency-domain resource, a time-domain resource identifier configured to indicate the time-domain resource and a time-domain resource period, a space-domain resource identifier configured to indicate the space-domain resource or a combined resource identifier configured to indicate at least two resources in the frequency-domain resource, the time-domain resource and the space-domain resource.

Optionally, when the resource identifier includes the time-domain resource identifier, the determination module 601 is specifically configured to:

determine the frequency-domain resource configured to transmit the reference signal according to any one of the following correspondences: $i_f=\mod(RN,I_f)$, $i_f=\mod(P_i,I_f)$, $i_f=\mod(Dt_i,I_f)$ or $i_f=\mod(i_t,I_f)$; and/or determine the space-domain resource configured to transmit the reference signal according to any one of the following correspondences: $i_l=\mod(RN,I_l)$, $i_l=\mod(P_i,I_l)$, $i_l=\mod(Dt_i,I_l)$ or $i_l=\mod(i_t,I_l)$.

RN represents a resource serial number of the time-domain resource in the time-domain resource period, $P_i$ represents a serial number of the time-domain resource period, $Dt_i$ represents a time bucket or time point corresponding to the time-domain resource in the time-domain resource period, $i_t$ represents the time-domain resource identifier, $i_f$ represents the frequency-domain resource identifier, $i_l$ represents the space-domain resource identifier, $I_f$ represents a maximum frequency-domain resource identifier number and $I_l$ represents a maximum space-domain resource identifier number.

Optionally, when the resource identifier includes the frequency-domain resource identifier, the determination module 601 is specifically configured to:

determine the time-domain resource configured to transmit the reference signal according to $i_t=\mod(i_f,I_t)$; and/or determine the space-domain resource configured to transmit the reference signal according to $i_l=\mod(i_f,I_l)$.

$i_t$ represents the time-domain resource identifier, $I_t$ represents a maximum time-domain resource identifier number, $i_f$ represents the frequency-domain resource identifier, $I_l$ represents the maximum space-domain resource identifier number and $i_l$ represents the space-domain resource identifier.

Optionally, when the resource identifier includes the space-domain resource identifier, the determination module 601 is specifically configured to:

determine the time-domain resource configured to transmit the reference signal according to $i_t=\mod(i_l,I_t)$; and/or determine the frequency-domain resource configured to transmit the reference signal according to $i_f=\mod(i_l,I_f)$.

$i_t$ represents the time-domain resource identifier, $I_t$ represents the maximum time-domain resource identifier number, $i_f$ represents the frequency-domain resource identifier, $I_f$ represents the maximum frequency-domain resource identifier number and $i_l$ represents the space-domain resource identifier.

Optionally, the receiving module 602 is specifically configured to:

receive the indication information carried in high-layer signaling, physical-layer signaling or a MAC-layer notification from the network device.

Optionally, the receiving module 602 is further configured to:

if the target resource is changed, receive a paging message sent by the network device, the paging message including information of the changed target resource or an indication message configured to indicate that the target resource is changed.

Figure 7:
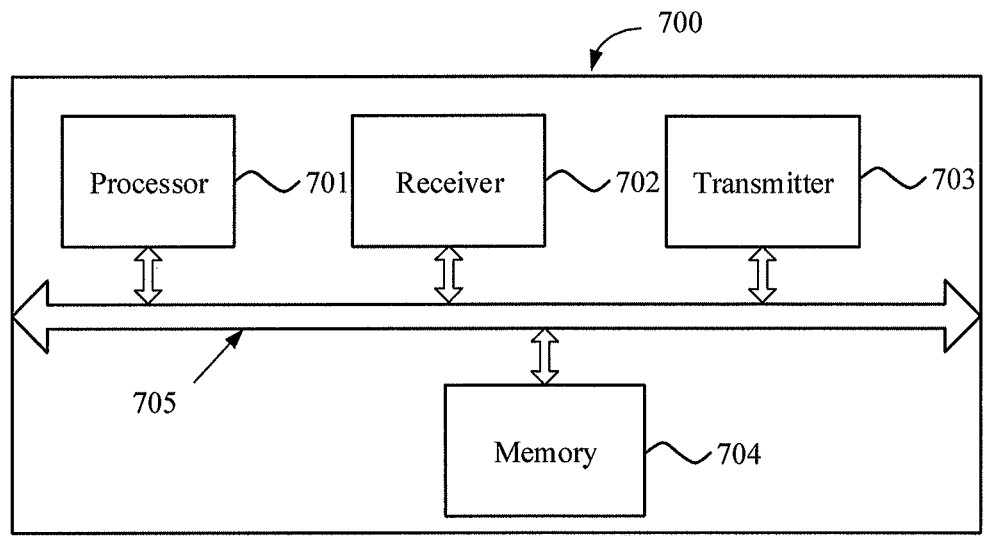
FIG. 7 is another structure block diagram of a terminal device according to an embodiment of the disclosure.

It is to be noted that, in the embodiment of the disclosure, the receiving module 602 may be implemented by a receiver and the determination module 601 may be implemented by a processor. As shown in FIG. 7, a terminal device 700 may include a processor 701, a receiver 702, a transmitter 703 and a memory 704. The memory 704 may be configured to store location information, resource identifier and the like of a reference signal and may further be configured to store a code executed by the processor 401 and the like. The processor 701 is configured to execute the code stored in the memory 704. Each component in the terminal device 700 is coupled together through a bus system 705. The bus system 705 includes a data bus, and further includes a power bus, a control bus and a state signal bus. The processor 701 is specifically configured to:

determine a target resource configured to transmit the reference signal, the target resource being part of resources in transmission resources available for transmission of the reference signal and the target resource including at least one of a frequency-domain resource, a time-domain resource and a space-domain resource.

The receiver 702 is configured to receive the reference signal sent by a network device on the target resource determined by a determination module.

Optionally, the processor 701 is specifically configured to:

determine a reference identifier, the reference identifier including a cell identifier or a beam identifier; and determine the target resource configured to transmit the reference signal according to the reference identifier and a correspondence between a reference identifier and a resource identifier, the resource identifier corresponding to the target resource one to one.

Optionally, the correspondence between the reference identifier and the resource identifier may include i=mod(Cell ID,I) or i=mod(Beam ID,I), where i represents the resource identifier, Cell ID represents the cell identifier, Beam ID represents the beam identifier and I represents a maximum resource identifier number.

Optionally, the receiver 702 is further configured to:

receive indication information sent by the network device, the indication information including resource indication information configured to indicate the target resource.

Optionally, the receiver 702 is further configured to:

receive indication information sent by the network device, the indication information including identifier indication information configured to indicate a resource identifier.

The processor 701 is further configured to determine the target resource corresponding to the resource identifier one to one according to the identifier indication information.

Optionally, the resource identifier includes at least one of the following identifiers:

a frequency-domain resource identifier configured to indicate the frequency-domain resource, a time-domain resource identifier configured to indicate the time-domain resource and a time-domain resource period, a space-domain resource identifier configured to indicate the space-domain resource or a combined resource identifier configured to indicate at least two resources in the frequency-domain resource, the time-domain resource and the space-domain resource.

Optionally, when the resource identifier includes the time-domain resource identifier, the processor 701 is specifically configured to:

determine the frequency-domain resource configured to transmit the reference signal according to any one of the following correspondences: $i_f=\mathrm{mod}(RN,I_f)$, $i_f=\mathrm{mod}(P_i,I_f)$, $i_f=\mathrm{mod}(Dt_i,I_f)$ or $i_f=\mathrm{mod}(i_t,I_f)$; and/or determine the space-domain resource configured to transmit the reference signal according to any one of the following correspondences: $i_l=\mathrm{mod}(RN,I_l)$, $i_l=\mathrm{mod}(P_i,I_l)$, $i_l=\mathrm{mod}(Dt_i,I_l)$ or $i_l=\mathrm{mod}(i_t,I_l)$.

RN represents a resource serial number of the time-domain resource in the time-domain resource period, $P_i$ represents a serial number of the time-domain resource period, $Dt_i$ represents a time bucket or time point corresponding to the time-domain resource in the time-domain resource period, $i_t$ represents the time-domain resource identifier, $i_f$ represents the frequency-domain resource identifier, $i_l$ represents the space-domain resource identifier, $I_f$ represents a maximum frequency-domain resource identifier number and $I_l$ represents a maximum space-domain resource identifier number.

Optionally, when the resource identifier includes the frequency-domain resource identifier, the processor 701 is specifically configured to:

determine the time-domain resource configured to transmit the reference signal according to $i_t=\mathrm{mod}(i_f,I_t)$; and/or determine the space-domain resource configured to transmit the reference signal according to $i_l=\mathrm{mod}(i_f,I_l)$.

$i_t$ represents the time-domain resource identifier, $I_t$ represents a maximum time-domain resource identifier number, $i_f$ represents the frequency-domain resource identifier, $I_l$ represents the maximum space-domain resource identifier number and $i_l$ represents the space-domain resource identifier.

Optionally, when the resource identifier includes the space-domain resource identifier, the processor 701 is specifically configured to:

determine the time-domain resource configured to transmit the reference signal according to $i_t=\mathrm{mod}(i_l,I_t)$; and/or determine the frequency-domain resource configured to transmit the reference signal according to $i_f=\mathrm{mod}(i_l,I_f)$.

$i_t$ represents the time-domain resource identifier, $I_t$ represents the maximum time-domain resource identifier number, $i_f$ represents the frequency-domain resource identifier, $I_f$ represents the maximum frequency-domain resource identifier number and $i_l$ represents the space-domain resource identifier.

Optionally, the receiver 702 is specifically configured to:

receive the indication information carried in high-layer signaling, physical-layer signaling or a MAC-layer notification from the network device.

Optionally, the receiver 702 is further configured to:

if the target resource is changed, receive a paging message sent by the network device, the paging message including information of the changed target resource or an indication message configured to indicate that the target resource is changed.

Figure 8:
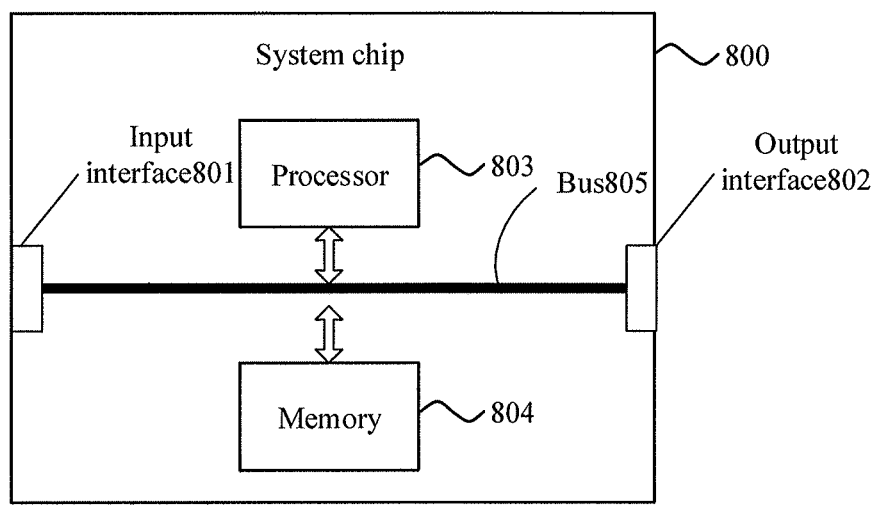
FIG. 8 is another schematic structure diagram of a system chip according to an embodiment of the disclosure.

FIG. 8 is another schematic structure diagram of a system chip according to an embodiment of the disclosure. The system chip 800 of FIG. 8 includes an input interface 801, an output interface 802, at least one processor 803 and a memory 804. The input interface 801, the output interface 802, the processor 803 and the memory 804 are connected through a bus 805. The processor 803 is configured to execute a code in the memory 804. When the code is executed, the processor 803 may implement the method executed by a terminal device 20 in FIG. 2.

The terminal device 600 shown in FIG. 6 or the terminal device 700 shown in FIG. 7 or the system chip 800 shown in FIG. 8 may implement each process implemented by the terminal device 20 in the method embodiment of FIG. 2. No more elaborations will be made herein to avoid repetitions.

It should be understood that the processor in the embodiment of the disclosure may be an integrated circuit chip and has a signal processing capability. In an implementation process, each step of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor and the like. The steps of the methods disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the steps of the methods in combination with hardware.

It can be understood that the memory in the embodiment of the disclosure may be a volatile memory or a nonvolatile memory, or may include both the volatile and nonvolatile memories, wherein the nonvolatile memory may be a ROM, a PROM, an Electrically PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

In addition, terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

It should be understood that, in the embodiments of the disclosure, "B corresponding to A" represents that B is associated with A and B may be determined according to A. It should also be understood that determining B according to A does not mean that B is determined only according to A and B may also be determined according to A and/or other information.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the application, it should be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be PHY units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for transmitting a reference signal, comprising:
   determining, by a network device, a target resource for transmitting a reference signal, the target resource being part of transmission resources available for transmission of the reference signal and the target resource comprising at least one of a time-domain resource or a space-domain resource;
   transmitting, by the network device, indication information to the terminal device, the indication information comprising identifier indication information for indicating a resource identifier, and the resource identifier corresponding to the target resource for transmitting the reference signal one to one; and
   transmitting, by the network device, the reference signal to a terminal device on the target resource;
   wherein the resource identifier comprises at least one of the following identifiers:
   a time-domain resource identifier configured to indicate the time-domain resource and a time-domain resource period, a space-domain resource identifier configured to indicate the space-domain resource, or a combined resource identifier configured to indicate the time-domain resource and the space-domain resource;
   wherein when the resource identifier comprises the time-domain resource identifier, determining, by the network device, the target resource for transmitting the reference signal comprises:

determining, by the network device, the space-domain resource configured to transmit the reference signal according to any one of the following correspondences:

$i_t=\mod(RN,I_l), i_t=\mod(P_i,I_l), i_t=\mod(Dt_i,I_l)$ or $i_t=\mod(i_i,I_l)$, where RN represents a resource serial number of the time-domain resource in the time-domain resource period, $P_i$ represents a serial number of the time-domain resource period, $Dt_i$ represents a time bucket or time point corresponding to the time-domain resource in the time-domain resource period, $i_t$ represents the time-domain resource identifier, $i_l$ represents the space-domain resource identifier, and $I_l$ represents a maximum space-domain resource identifier number.

2. The method of claim 1, wherein determining, by the network device, the target resource configured to transmit the reference signal comprises:
determining, by the network device, a reference identifier, the reference identifier comprising a cell identifier or a beam identifier; and
determining, by the network device, the target resource configured to transmit the reference signal according to the reference identifier and a correspondence between a reference identifier and the resource identifier, the resource identifier corresponding to the target resource one to one.

3. The method of claim 1, wherein transmitting, by the network device, the indication information to the terminal device comprises:
transmitting, by the network device, the indication information carried in high-layer signaling, physical-layer signaling or a Media Access Control (MAC)-layer notification to the terminal device.

4. The method of claim 2, wherein the correspondence between the reference identifier and the resource identifier comprises $i=\mod(\text{Cell ID},I)$ or $i=\mod(\text{Beam ID},I)$, where i represents the resource identifier, Cell ID represents the cell identifier, Beam ID represents the beam identifier and/represents a maximum resource identifier number.

5. The method of claim 1, wherein when the resource identifier comprises the space-domain resource identifier, determining, by the network device, the target resource for transmitting the reference signal comprises:
determining, by the network device, the time-domain resource configured to transmit the reference signal according to $i_t=\mod(i_l, I_t)$;
where $i_t$ represents the time-domain resource identifier, $I_t$ represents a maximum time-domain resource identifier number, and $i_l$ represents the space-domain resource identifier.

6. The method of claim 1, further comprising:
when the target resource is changed, transmitting, by the network device, a paging message to the terminal device, the paging message comprising information of the changed target resource or an indication message configured to indicate that the target resource is changed.

7. A method for receiving a reference signal, comprising:
determining, by a terminal device, a target resource for transmitting a reference signal, the target resource being part of transmission resources available for transmission of the reference signal and the target resource comprising at least one of a time-domain resource or a space-domain resource; and receiving, by the terminal device, the reference signal sent by a network device on the target resource;
wherein determining, by the terminal device, the target resource configured to transmit the reference signal comprises:
receiving, by the terminal device, indication information sent by the network device, the indication information comprising identifier indication information for indicating a resource identifier; and
determining, by the terminal device, the target resource corresponding to the resource identifier one to one according to the identifier indication information;
wherein the resource identifier comprises at least one of the following identifiers:
a time-domain resource identifier configured to indicate the time-domain resource and a time-domain resource period, a space-domain resource identifier configured to indicate the space-domain resource, or a combined resource identifier configured to indicate the time-domain resource and the space-domain resource;
wherein when the resource identifier comprises the time-domain resource identifier, determining, by the terminal device, the target resource for transmitting the reference signal comprises:
determining, by the terminal device, the space-domain resource configured to transmit the reference signal according to any one of the following correspondences:

$i_t=\mod(RN,I_l), i_t=\mod(P_i,I_l), i_t=\mod(Dt_i,I_l)$ or $i_t=\mod(i_i,I_l)$, where RN represents a resource serial number of the time-domain resource in the time-domain resource period, $P_i$ represents a serial number of the time-domain resource period, $Dt_i$ represents a time bucket or time point corresponding to the time-domain resource in the time-domain resource period, $i_t$ represents the time-domain resource identifier, $i_l$ represents the space-domain resource identifier, and $I_l$ represents a maximum space-domain resource identifier number.

8. The method of claim 7, wherein determining, by the terminal device, the target resource configured to transmit the reference signal comprises:
determining, by the terminal device, a reference identifier, the reference identifier comprising a cell identifier or a beam identifier; and
determining, by the terminal device, the target resource configured to transmit the reference signal according to the reference identifier and a correspondence between a reference identifier and the resource identifier, the resource identifier corresponding to the target resource one to one.

9. The method of claim 7, wherein receiving, by the terminal device, the indication information sent by the network device comprises:
receiving, by the terminal device, the indication information carried in high-layer signaling, physical-layer signaling or a Media Access Control (MAC)-layer notification from the network device.

10. The method of claim 8, wherein the correspondence between the reference identifier and the resource identifier comprises $i=\mod(\text{Cell ID},I)$ or $i=\mod(\text{Beam ID},I)$, where i represents the resource identifier, Cell ID represents the cell identifier, Beam ID represents the beam identifier and I represents a maximum resource identifier number.

11. The method of claim 7, wherein when the resource identifier comprises the space-domain resource identifier, determining, by the network device, the target resource for transmitting the reference signal comprises:
   determining, by the terminal device, the time-domain resource identifier configured for transmission of the reference signal according to $i_t=\text{mod}(i_l, I_t)$;
   where $i_t$ represents the time-domain resource identifier, $I_t$ represents a maximum time-domain resource identifier number, and $i_l$ represents the space-domain resource identifier.

12. The method of claim 7, further comprising:
   when the target resource is changed, receiving, by the terminal device, a paging message sent by the network device, the paging message comprising information of the changed target resource or an indication message configured to indicate that the target resource is changed.

13. A terminal device, comprising:
   a memory, configured to store instructions executable by a processor;
   a processor, configured to execute the instructions to determine a target resource for transmitting a reference signal, the target resource being part of transmission resources available for transmission of the reference signal and the target resource comprising at least one of a time-domain resource or a space-domain resource; and
   a receiver, configured to: receive the reference signal sent by a network device on the target resource;
   wherein
   the receiver is further configured to receive indication information sent by the network device, the indication information comprising identifier indication information for indicating a resource identifier; and
   the processor is further configured to determine the target resource corresponding to the resource identifier one to one according to the identifier indication information;
   wherein the resource identifier comprises at least one of the following identifiers:
   a time-domain resource identifier configured to indicate the time-domain resource and a time-domain resource period, a space-domain resource identifier configured to indicate the space-domain resource, or a combined resource identifier configured to indicate the time-domain resource and the space-domain resource;
   wherein when the resource identifier comprises the time-domain resource identifier, the processor is specifically configured to:
      determine the space-domain resource configured to transmit the reference signal according to any one of the following correspondences:

$i_l=\text{mod}(RN, I_l), i_l=\text{mod}(P_i, I_l), i_l=\text{mod}(Dt_i, I_l)$ or $i_l=\text{mod}(i_t, I_l)$, where RN represents a resource serial number of the time-domain resource in the time-domain resource period, $P_i$ represents a serial number of the time-domain resource period, $Dt_i$ represents a time bucket or time point corresponding to the time-domain resource in the time-domain resource period, $i_t$ represents the time-domain resource identifier, $i_l$ represents the space-domain resource identifier, and $I_l$ represents a maximum space-domain resource identifier number.

14. The terminal device of claim 13, wherein the processor is further configured to:
   determine a reference identifier, the reference identifier comprising a cell identifier or a beam identifier; and
   determine the target resource configured to transmit the reference signal according to the reference identifier and a correspondence between a reference identifier and the resource identifier, the resource identifier corresponding to the target resource one to one.

15. The terminal device of claim 13, wherein the receiver is further configured to:
   receive the indication information carried in high-layer signaling, physical-layer signaling or a Media Access Control (MAC)-layer notification from the network device.

16. The terminal device of claim 14, wherein the correspondence between the reference identifier and the resource identifier comprises $i=\text{mod}(\text{Cell ID}, I)$ or $i=\text{mod}(\text{Beam ID}, I)$, where $i$ represents the resource identifier, Cell ID represents the cell identifier, Beam ID represents the beam identifier and $I$ represents a maximum resource identifier number.

17. The terminal device of claim 13, wherein when the resource identifier comprises the space-domain resource identifier, the processor is specifically configured to:
   determine the time-domain resource configured to transmit the reference signal according to $i_t=\text{mod}(i_l, I_t)$;
   where $i_t$ represents the time-domain resource identifier, $I_t$ represents a maximum time-domain resource identifier number, and $i_l$ represents the space-domain resource identifier.

\* \* \* \* \*